United States Patent [19]

McDonough

[11] Patent Number: 5,038,719
[45] Date of Patent: Aug. 13, 1991

[54] DOG LEASH FOR RUNNER

[76] Inventor: John A. McDonough, 3749 Perry Ave. N., Robbinsdale, Minn. 55422

[21] Appl. No.: 498,606

[22] Filed: Mar. 26, 1990

[51] Int. Cl.⁵ .............................................. A01K 27/00
[52] U.S. Cl. .................................... 119/110; 119/109
[58] Field of Search ................. 119/96, 109, 110, 101, 119/106; D30/152, 153; 54/34; 272/143, 75; 2/311, 312; 224/184, 224, 254, 256, 267, 269, 0.5

[56] References Cited

U.S. PATENT DOCUMENTS

| | | | |
|---|---|---|---|
| 2,275,983 | 3/1942 | Nadeau | 119/96 |
| 2,333,488 | 11/1943 | Parth | 119/109 |
| 2,356,715 | 8/1944 | Webster | 119/109 |
| 2,861,547 | 11/1958 | Dale | 119/109 |
| 2,994,300 | 8/1961 | Grahling | 119/96 |
| 3,104,650 | 9/1963 | Grahling | 119/96 |
| 3,212,690 | 10/1965 | Green | 224/224 |
| 3,295,501 | 1/1967 | Riley | 119/96 |
| 3,332,398 | 7/1967 | Mintz | 119/109 |
| 3,752,127 | 8/1973 | Baker | 119/109 |
| 4,308,629 | 1/1982 | Freemon | 119/96 |
| 4,638,764 | 1/1987 | Anderson | 119/96 |
| 4,667,624 | 5/1987 | Smith | 119/96 |
| 4,676,198 | 6/1987 | Murray | 119/96 |
| 4,879,972 | 11/1989 | Crowe et al. | 119/109 |
| 4,932,362 | 6/1990 | Birchmire, III et al. | 119/96 |

FOREIGN PATENT DOCUMENTS

| | | | |
|---|---|---|---|
| 0426081 | 3/1935 | United Kingdom | 119/109 |
| 0634446 | 3/1950 | United Kingdom | 119/109 |

Primary Examiner—Robert P. Swiatek
Assistant Examiner—Todd E. Manahan
Attorney, Agent, or Firm—Palmatier & Sjoquist

[57] ABSTRACT

A dog leash for a runner includes a belt portion and a tether portion which is quickly shortened. The tether portion includes a handle with a readily graspable hand-sized strip of flexible material forming a loop with an opening at least the size of a hand. A portion of the handle is disposed approximately midway on the tether portion and is connectable to a clip on the belt portion to shorten the effective length of the leash. The belt portion is substantially one-piece with the tether portion and includes quick release and adjustable buckles.

20 Claims, 3 Drawing Sheets

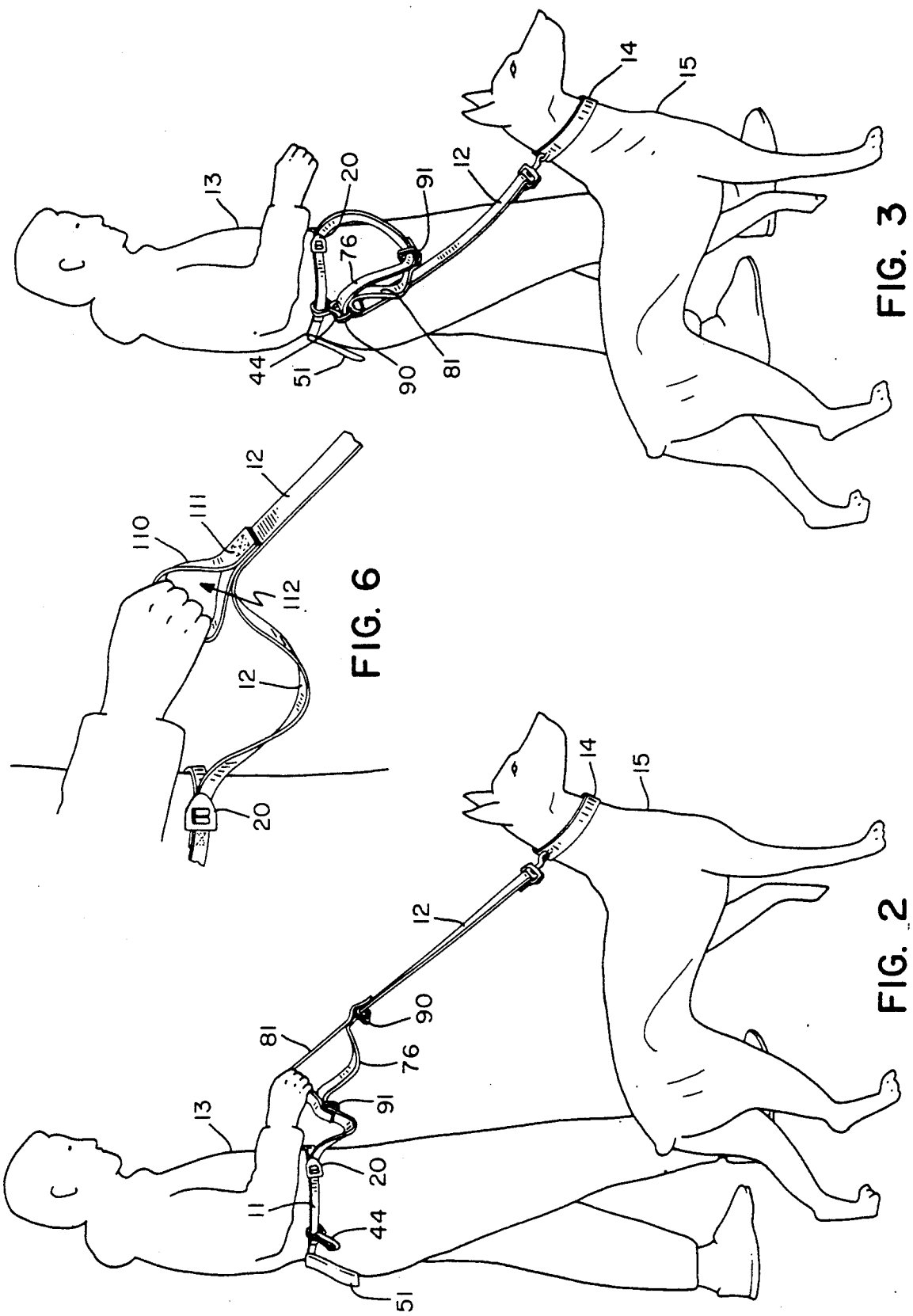

DOG LEASH FOR RUNNER

The present invention relates to a dog leash and, more particularly, to a dog leash for a runner that is wrappable around and extendable from the waist of the runner.

BACKGROUND OF THE INVENTION

Local ordinances often require dogs to be leashed when on public property. Such regulations pose special problems for the runner who is required to hold one end of a leash and whose exercise is easier and more enjoyable if both arms are free to swing naturally with the running gait.

SUMMARY OF THE INVENTION

A feature of the present invention is the provision in a leash extending from a person to a dog, of an attaching means on the proximal end of a tether and a handle with a hand-sized portion between the proximal and distal ends wherein the handle includes a connecting means for connecting the handle to the attaching means for shortening the effective length of the tether.

Another feature is the provision in such a leash, of a belt wrappable around the waist of the person and being in substantially one-piece with the tether.

Another feature is the provision in such a leash, of the handle including a flexible element affixed to the tether at two spaced apart locations and wherein the length of the flexible element is greater than the distance between the two locations on the tether such that the flexible element is slack relative to the tether between the two locations.

Another feature is the provision in such a leash, of a clip on the belt for receiving the handle to shorten the leash.

Another feature is the provision in such a leash, of a buckle on the belt having quick release means for quickly releasing the belt and the tether relative to the person.

An advantage of the present invention is that both arms of a runner swing freely while his or her dog remains leashed.

Another advantage is that the dog is quickly brought to the runner's side in heavy traffic, whether the traffic be cars, pedestrians, or other dogs.

Another advantage is that the dog is quickly secured to the runner's side when the situation requires such control of the dog.

Another advantage is that the belt and tether is quickly releasable relative to the person so that the dog may be quickly unleashed such as when the accompanying person is a child overpowered by the dog.

Another advantage is that the present leash may be utilized for dog trainers or for walking a dog.

Other advantages are that the leash is simple and inexpensive to manufacture and easy to operate.

BRIEF DESCRIPTION OF THE DRAWINGS

FIG. 2 is perspective view of the runner holding the handle of the leash of FIG. 1 to control the dog.

FIG. 3 is a perspective view of the runner securing the dog to his side by decreasing the effective length of the leash of FIG. 1 via the handle being clipped to the belt.

FIG. 6 is a view of an alternate embodiment of the handle for the leash of FIG. 1.

DETAILED DESCRIPTION OF THE PREFERRED EMBODIMENTS

Figure 1:
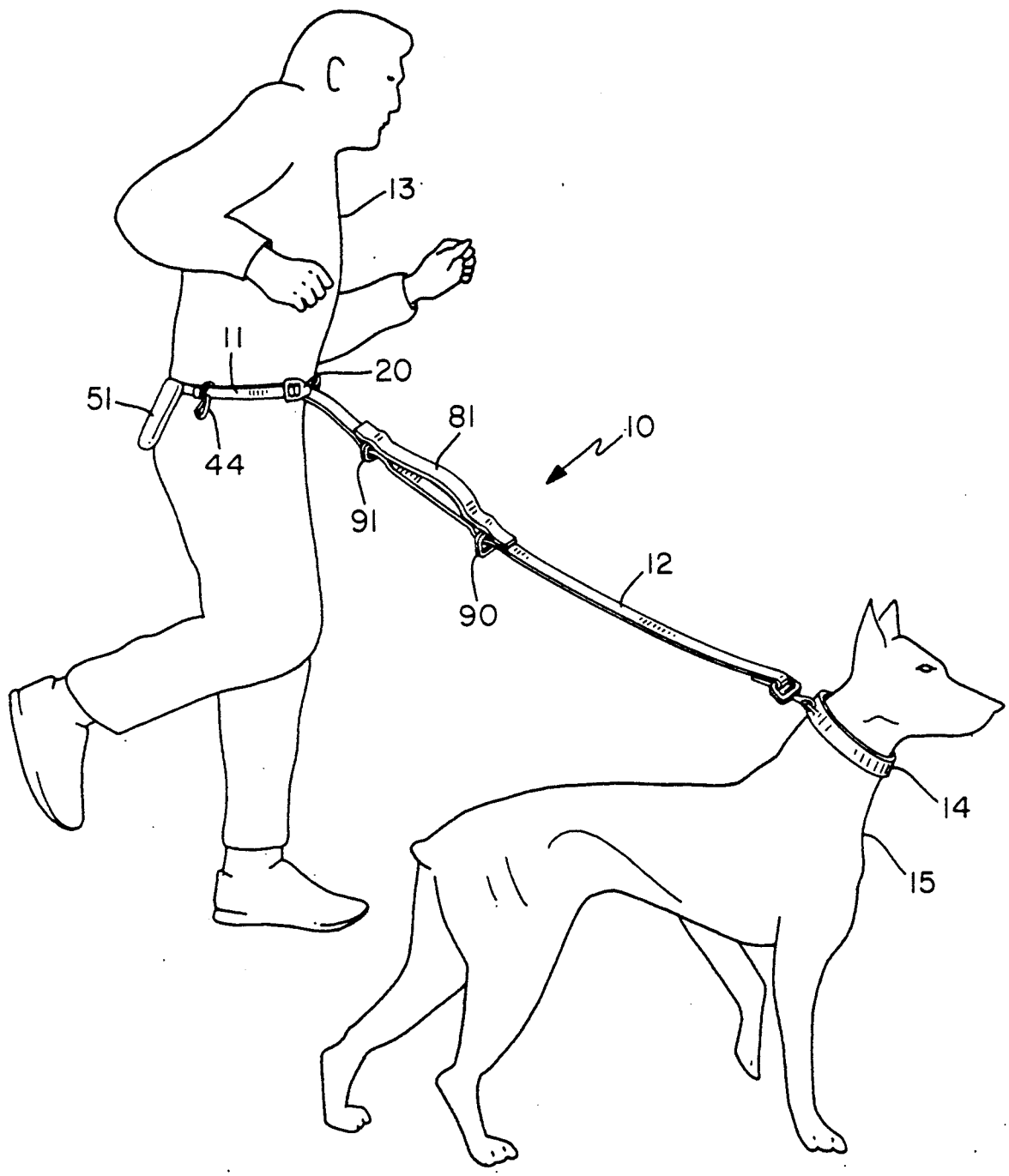
FIG. 1 is a perspective view of the leash buckled about the waist of a runner and extending to a dog.
Figure 4:
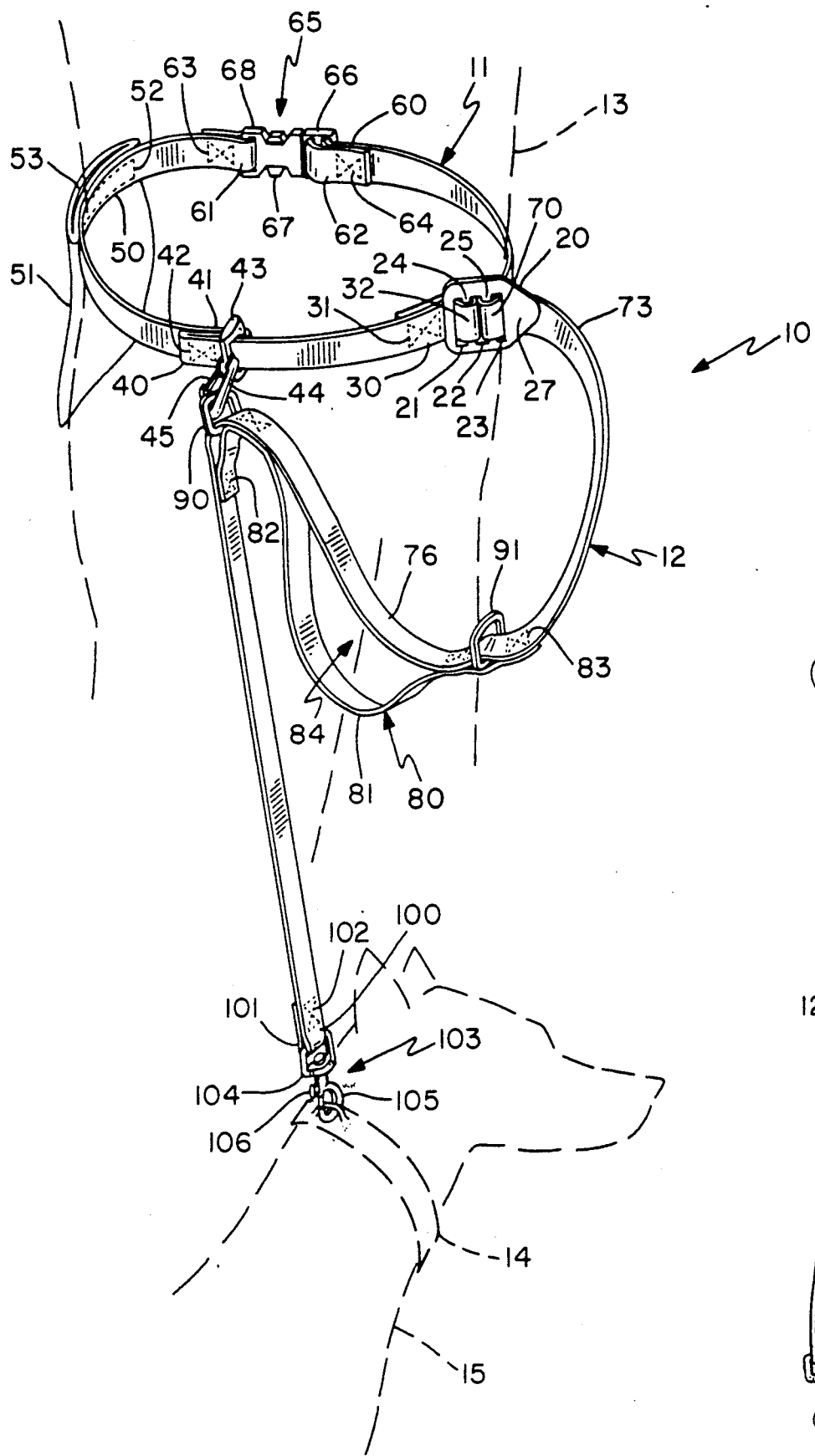
FIG. 4 is a perspective, detail view of the leash of FIG. 1.
Figure 5:
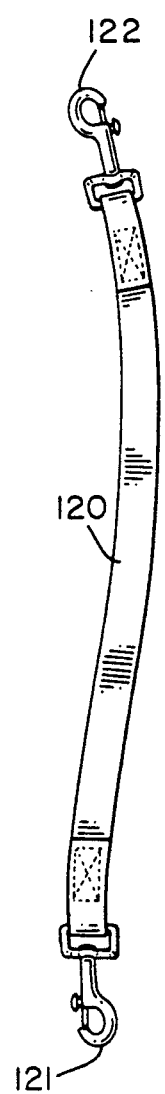
FIG. 5 is an elevation view of an extension for the leash of FIG. 1 for tethering a second dog.

The present dog leash is indicated in general by the reference numeral 10 and includes as its principle components a belt 11 and a tether 12. The belt 11 is buckled around the waist of a runner 13 and the tether 12 extends from the belt 11 to a collar 14 of a dog 15. The belt 11 and tether 12 are substantially one-piece and formed from nylon.

The belt or tether attaching means 11 includes an adjustable buckle or belt adjusting means 20 for adjusting the effective length of the belt 11. The buckle 20 includes a set of three slots 21, 22, 23 defined in part by a pair of belt posts or transverse arms 24, 25. A plurality of teeth extend perpendicularly from the inside face of the buckle 20 near slot 23 to dig into a portion of the belt 11 and maintain the belt 11 at a desired circumference. The buckle 20 further includes a tapered end 27 for manipulating the buckle 20 during adjustment of the length of the belt 11.

A fixed end 30 of the belt 11 is pivotally affixed to the buckle 20. The end 30 is stitched via stitches 31 to form a belt loop 32 which is looped around and pivotal about buckle arm 24.

From the fixed end 30, the belt 11 extends to a clip mounting belt portion 40. The belt portion 40 forms a belt loop 41 with stitching 42 for mounting a bracket 43. The bracket 43 is pivotable in the belt loop 41 and relative the belt 11 and in turn pivotally mounts a clip 44. The clip 44 includes a resilient flat spring 45.

From the clip mounting belt portion 40, the belt 11 extends to a pouch mounting belt portion 50. The belt portion 50 mounts a pouch or purse 51 with stitching 52. The interior of the pouch 51 is accessible through a Velcro ® sealable opening 53 with hook and loop closure means. The pouch 51 is typically formed of nylon.

From the pouch mounting belt portion 50, the belt 11 extends to a buckle mounting belt portion 60. The belt portion 60 forms a pair of belt loops 61, 62 with respective stitching 63, 64 for mounting a quick release buckle 65. The buckle 65 includes a male end 66 pivotally affixed in belt loop 62. A pair of resilient prongs 67 extend from the male end 66 into a female end 68 which is pivotally affixed in belt loop 61. The female end 68 is released from the male end 66 by pinching the prongs 67 toward each other.

From the quick release buckle mounting portion 60, the belt 11 extends to a general belt portion 70 which is looped around buckle post 25 of the adjustable buckle 20. The belt portion 70 bears against the teeth of the inside face of the buckle 20 when the belt 11 is in place about the waist of the runner 13. The circumference of the belt 11 is increased or decreased be manipulating the toothed tapered end 27 and drawing the belt portion 70 through slots 22, 23 and around the buckle post 25.

The general belt portion 70 is formed integrally with the tether 12 at a general proximal end 73 of the tether 12. The tether 12 extends from the proximal end 73 to a handle mounting portion 76. The handle mounting portion 76 mounts a handle 80 which includes a flexible strip of nylon or connection means 81 stitched to the tether portion 76 at two locations with two respective sets of stitches 82, 83. The length of the nylon strip 81 is greater than the length of handle mounting portion 76 between the sets of stitches 82, 83 to form an opening 84 at least the size of a hand. The length of handle mounting portion 76 and the length of nylon strip 81 is preferably at least the length of the width of a hand.

The sets of stitches 82, 83 pivotally join respective rings or fasteners or connecting means 90, 91 to the tether 12. Each of the rings 90, 91 is rigid and clippable quickly into the clip 44 to shorten the effective length of the tether 12. The nylon strip 81, as well as the handle mounting portion 76, are independently clippable quickly into the clip 44 to shorten the effective length of the tether 12. Ring 90 is typically disposed at or near a midpoint on the tether 12. Ring 91 and proximal portions of the flexible strip 81 and handle mounting portion 76 are typically disposed at an arm's length from proximal end 73 so that the handle 80 is readily grabbed.

From the handle mounting portion 76, the tether 12 extends to a distal end 100 which forms belt loop portion 101 with stitching 102. The distal end 100 mounts a clasp or securing means 103 for securing the tether 12 to the dog collar 14. The clasp 103 includes a bracket 104 pivotally joined to the belt loop portion 101, a hook 105 rotatably joined to the bracket 104, and a spring operated closer pin 106 for closing the hook 105.

In operation, the leash 10 is buckled to the waist of the runner 13 by utilizing the quick release buckle 65. The belt 11 is adjusted to the appropriate waist circumference with the adjusting buckle 20. The leash 10 is subsequently joined to the collar 14 of the dog 15 with the clasp 103.

During a run, the arms of the runner 13 swing freely and naturally. When it becomes desirable to secure the dog 15 to the side of the runner 13, the handle 80 is grasped preferably on either the tether portion 76 or flexible nylon strip 81 and the dog 15 is drawn to the side of the runner 13. Subsequently, one of the ring-like fasteners 90, 91 is clipped to the clip 44 to shorten the effective length of the tether 12. It should be noted that either the tether portion 76 or nylon strip 81 may also be clipped to the clip 44 to shorten the effective length of the tether 12. When it becomes desirable to increase the length of the tether 12, the ring-like fastener 90 (or 91) is simply removed from the clip 44. At the end of the run, or during a run if it is desired to unleash the dog 15 in, for example, an emergency, the belt 11 is quickly unbuckled via the quick release buckle 65 to remove the belt 11 and tether 12 from the waist of the runner 13.

In an alternate embodiment of the invention, a strip of nylon 110 is stitched on the tether 12 at one location with stitching 111 approximately midway between the proximal and distal ends 73, 100. The strip of nylon or connecting means 110 forms a loop with an opening 112 at least the size of a hand and is connectable to the clip 44.

In another alternate embodiment of the invention, a leash portion 120 includes a pair of clasps 121, 122. The leash portion 120 is connectable between one of the rings 90, 91 and a second dog. It should be noted that two leash portions 120 may be utilized, along with distal end 100, for walking or running with three dogs.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

I claim:

1. A dog leash for extending from a person to a dog comprising:
   (a) a tether with a proximal end and a distal end, the proximal end having attaching means for attaching the tether to the person, the distal end having securing means for securing the tether to the dog; and
   (b) a handle affixed to and extending from the tether and being disposed between the proximal and distal ends, the handle having a hand-sized portion for being grasped and further having connecting means for being connected to the attaching means whereby the handle is readily graspable by the person and connectable to the attaching means to quickly shorten the effective length of the tether.

2. The leash according to claim 1, wherein the hand-sized portion includes an opening at least hand-sized for the insertion of a hand.

3. The leash according to claim 1, wherein the handle includes a flexible element forming at least in part a loop which includes the hand-sized portion.

4. The leash according to claim 1, wherein the handle includes a flexible element affixed to the tether at two spaced apart locations, the length of the flexible element being greater than the distance between the two locations on the tether such that the flexible element is slack relative to the tether between the two locations.

5. The leash according to claim 4, wherein the connecting means includes a fastener with a rigid portion disposed at each of the two locations, each of the fasteners and the flexible element being connectable to the attaching means.

6. The leash according to claim 5 for leashing two or more dogs, and further comprising a leash portion with two ends, and a securing means on each of the ends for securing the leash portion between one of the fasteners and at least one more dog.

7. The leash according to claim 1, wherein a portion of the handle is disposed at approximately an arm's length from the proximal end.

8. The leash according to claim 1, wherein a portion of the handle is disposed approximately midway between the proximal and distal ends.

9. The leash according to claim 1, wherein the handle is affixed to the tether at generally one location, the handle forming a loop having an opening at least the size of a hand.

10. The leash according to claim 1, wherein the attaching means for attaching the tether to the person comprises a belt wrappable around the waist of the person, the belt and tether being formed generally of one piece.

11. The leash according to claim 10, wherein the attaching means further includes a clip to which the connecting means of the handle is connectable.

12. The leash according to claim 10, wherein the belt includes a quick release means for quickly releasing the belt and tether relative to the person.

13. The leash according to claim 10, wherein the belt includes an adjusting means for adjusting the effective length of the belt.

14. The leash according to claim 10, wherein the belt includes a pouch affixed thereto.

15. A dog leash for extending from a person to a dog comprising:

(a) a belt wrappable around the waist of the person;
(b) a tether having proximal and distal ends and a general medial portion disposed between the ends, the proximal end connectable to the belt and the distal end connectable to the dog; and
(c) connecting means on the belt and general medial portion of the tether for quickly connecting the general medial portion to the belt to quickly shorten the effective length of the tether the connecting means comprising a handle extending from the general medial portion of the tether, the handle being at least hand-sized.

16. The leash according to claim 15, wherein the connecting means includes a ring on the general medial portion of the tether and a clip on the belt.

17. The leash according to claim 15, wherein the handle includes a loop.

18. The leash according to claim 15, wherein the connecting means includes a flexible element with opposing ends and a pair of rings, each of the ends and rings being affixed to the tether at one of two spaced apart locations, the length of the flexible elements being greater than the distance between the two locations on the tether such that the flexible element is slack relative to the tether between the two locations.

19. The leash according to claim 15, wherein the belt and tether are formed from one-piece.

20. A dog leash for extending from a person to a dog comprising:
(a) a tether with a proximal end and a distal end, the proximal end having attaching means for attaching the tether to the person, the distal end having securing means for securing the tether to the dog;
(b) a handle affixed to and extending from the tether and being disposed between the proximal and distal ends, the handle comprising:
 (1) a flexible element affixed to the tether at two spaced apart locations, the length of the flexible element being greater than the distance between the two locations on the tether such that the flexible element is slack relative to the tether between the two locations, the flexible element and the tether forming an opening at least hand-sized for the insertion of a hand; and
 (2) a pair of fasteners, each of the fasteners having a rigid portion and being affixed at one of the two locations, one of the fasteners being affixed approximately midway between the proximal and distal ends; and
(c) the attaching means including a belt wrappable around the person, the belt and tether being substantially one-piece, the belt comprising:
 (1) a clip to which the flexible element and each of the fasteners is connectable such that the handle is readily graspable by the person and quickly connectable to the clip to quickly shorten the effective length of the tether;
 (2) a quick release buckle for quickly releasing the belt and tether relative to the person; and
 (3) an adjustable buckle for adjusting the effective length of the belt.

* * * * *